(12) United States Patent
Uneura et al.

(10) Patent No.: US 10,228,019 B2
(45) Date of Patent: Mar. 12, 2019

(54) BEARING STRUCTURE AND TURBOCHARGER

(71) Applicant: IHI Corporation, Koto-ku (JP)

(72) Inventors: Yutaka Uneura, Tokyo (JP); Shinichi Kaneda, Tokyo (JP); Yuichi Daito, Tokyo (JP); Hideyuki Kojima, Tokyo (JP); Tomomi Sugiura, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/434,514

(22) Filed: Feb. 16, 2017

(65) Prior Publication Data

US 2017/0159708 A1    Jun. 8, 2017

Related U.S. Application Data

(63) Continuation of application No. PCT/JP2015/076218, filed on Sep. 16, 2015.

(30) Foreign Application Priority Data

Sep. 30, 2014    (JP) ................. 2014-200335

(51) Int. Cl.
     *F16C 27/02*      (2006.01)
     *F16C 35/02*      (2006.01)
     (Continued)

(52) U.S. Cl.
     CPC ............ *F16C 27/02* (2013.01); *F01D 25/166* (2013.01); *F02B 37/00* (2013.01); *F04D 25/04* (2013.01);
     (Continued)

(58) Field of Classification Search
     CPC ...... F16C 35/02; F16C 23/04; F16C 2360/24; F02B 39/00; F02C 6/12
     See application file for complete search history.

(56) References Cited

U.S. PATENT DOCUMENTS 2,041,162 A * 5/1936 Buckwalter ........... B60L 337/04
                                               29/90.01
2,279,955 A * 4/1942 Sipe ..................... F16D 1/072
                                               403/277

(Continued)

FOREIGN PATENT DOCUMENTS

CN              1273622 A      11/2000
DE    11 2011 102 728 T5      6/2013
(Continued)

OTHER PUBLICATIONS

International Search Report dated Dec. 28, 2015 in PCT/JP2015/076218 filed Sep. 16, 2015 (with English translation).

(Continued)

*Primary Examiner* — Thomas R Hannon
(74) *Attorney, Agent, or Firm* — Oblon, McClelland, Maier & Neustadt, L.L.P.

(57) ABSTRACT

A bearing structure includes: a bearing hole formed in a bearing housing, a semi-floating metal bearing accommodated in the bearing hole and having a pin hole formed therein; a through-hole formed in the bearing housing and facing the pin hole in the semi-floating metal bearing; a regulating member which is inserted into the through-hole and in which a fixed portion is pressed onto an inner surface of the through-hole for the regulating member to be fixed to the bearing housing at a fixed position where a distal end portion is inserted into the pin hole; a regulating hole opened at a base end in the insertion direction of the regulating member and extending at least to the fixed portion toward the distal end side; and a pressing member provided in the regulating hole to expand the regulating hole by pressing an inner surface of the regulating hole.

15 Claims, 5 Drawing Sheets

(51) Int. Cl.
*F16C 17/02* (2006.01)
*F02B 37/00* (2006.01)
*F04D 25/04* (2006.01)
*F04D 29/056* (2006.01)
*F01D 25/16* (2006.01)
*F04D 29/057* (2006.01)
*F16C 17/10* (2006.01)

(52) U.S. Cl.
CPC ......... *F04D 29/056* (2013.01); *F04D 29/057* (2013.01); *F16C 17/02* (2013.01); *F16C 17/10* (2013.01); *F16C 35/02* (2013.01); *F05D 2220/40* (2013.01); *F05D 2260/37* (2013.01); *F16C 2226/50* (2013.01); *F16C 2360/24* (2013.01); *Y02T 10/144* (2013.01)

(56) References Cited

U.S. PATENT DOCUMENTS

| | | | | |
|---|---|---|---|---|
| 4,240,678 A * | 12/1980 | Sarle | ...... | F01D 25/166 384/369 |
| 4,256,441 A * | 3/1981 | Arora | ...... | F01D 25/166 384/276 |
| 4,531,847 A * | 7/1985 | F'Geppert | ...... | B23P 11/005 384/519 |
| 4,676,672 A * | 6/1987 | Tufty | ...... | F16C 35/063 384/537 |
| 5,259,689 A * | 11/1993 | Arand | ...... | F16B 21/065 403/16 |
| 5,584,372 A * | 12/1996 | Eichelsbacher | ...... | F16D 13/71 192/70.18 |
| 6,017,184 A * | 1/2000 | Aguilar | ...... | F01D 25/168 415/112 |
| 6,074,119 A * | 6/2000 | Schlanger | ...... | F16B 2/14 403/248 |
| 7,083,385 B2 * | 8/2006 | Omi | ...... | F04D 29/059 29/446 |
| 7,670,056 B2 | 3/2010 | Petitjean et al. | | |
| 8,186,947 B2 * | 5/2012 | Mathieu | ...... | F01D 25/166 415/229 |
| 9,051,848 B2 * | 6/2015 | Castan | ...... | F01D 25/162 |
| 9,260,981 B2 * | 2/2016 | Hornbach | ...... | F01D 17/06 |
| 9,850,911 B2 * | 12/2017 | Dayalan | ...... | F16C 33/1045 |
| 2004/0081376 A1 * | 4/2004 | Oelsch | ...... | F16C 17/04 384/100 |
| 2010/0068053 A1 | 3/2010 | Mathieu | | |
| 2013/0149116 A1 * | 6/2013 | Hornbach | ...... | F01D 17/06 415/170.1 |
| 2014/0219777 A1 * | 8/2014 | Uneura | ...... | F01D 25/186 415/112 |
| 2015/0093233 A1 | 4/2015 | Daguin et al. | | |

FOREIGN PATENT DOCUMENTS

| | | | |
|---|---|---|---|
| EP | 2 131 053 A1 | 12/2009 | |
| GB | 274954 A * | 7/1927 | ............ F16D 1/064 |
| JP | 45-3454 | 2/1970 | |
| JP | 2003-301921 | 10/2003 | |
| JP | 2005-188722 | 7/2005 | |
| JP | 2006-161913 | 6/2006 | |
| JP | 2006-266244 | 10/2006 | |
| JP | 2006-275083 | 10/2006 | |
| JP | 2010-138757 | 6/2010 | |
| JP | 2011-236967 | 11/2011 | |
| JP | 2013-155668 | 8/2013 | |
| JP | 2013-155669 | 8/2013 | |
| JP | 2014-47700 | 3/2014 | |
| WO | WO 2013/173220 A1 | 11/2013 | |

OTHER PUBLICATIONS

Written Opinion dated Dec. 28, 2015 in PCT/JP2015/076218 filed Sep. 16, 2015.
Office Action dated Jan. 26, 2018 in German Patent Application No. 11 2015 004 493.0.
Office Action dated Jun. 28, 2018 in Chinese Patent Application No. 201580052651.8 (6 pages).

* cited by examiner

BEARING STRUCTURE AND TURBOCHARGER

CROSS REFERENCE TO RELATED APPLICATIONS

This application is a continuation application of International Application No. PCT/JP2015/076218, filed on Sep. 16, 2015, which claims priority to Japanese Patent Application No. 2014-200335, filed on Sep. 30, 2014, the entire contents of which are incorporated by reference herein.

BACKGROUND

1. Technical Field

The present disclosure relates to a bearing structure in which a shaft is rotatably supported by a semi-floating metal bearing provided in a bearing hole and to a turbocharger.

2. Description of the Related Art

A conventional turbocharger has a bearing housing that rotatably holds a shaft. A turbine wheel is provided on one end of the shaft. A compressor wheel is provided on the other end of the shaft. The turbocharger is connected to an engine, and an exhaust gas exhausted from the engine flows into the turbocharger. When the turbine wheel is rotated by the exhaust gas, the compressor wheel is rotated via the shaft by this rotation of the turbine wheel. As described above, the turbocharger compresses air and sends the air to the engine, along with rotation of the compressor wheel.

A bearing hole is formed in the bearing housing. A bearing is provided in the bearing hole. The bearing has an insertion hole through which the shaft is inserted. A bearing surface that receives a radial load is formed on an inner circumferential surface of the bearing. The turbocharger described in Patent Literature 1 is provided with a semi-floating metal bearing which is one type of such a bearing. The semi-floating metal bearing has a body portion annularly (tubularly) formed. The body portion is provided with a pin hole. The pin hole penetrates the body portion in a radial direction. Furthermore, a housing forming the bearing hole is provided with a through-hole. The through-hole penetrates the housing to the bearing hole and is opened at a position facing the pin hole. In addition, a regulating member such as a pin is inserted from the through-hole to the pin hole. The regulating member regulates rotation of the semi-floating metal bearing.

CITATION LIST

Patent Literature

Patent Literature 1: Japanese Patent Application Laid-Open Publication No. 2013-155669

SUMMARY

The aforementioned regulating member is fixed to the housing by being press-fitted into the through-hole formed in, for example, the housing. Recently, in order to reduce a size of the turbocharger, the rotation number of the shafts tends to be increased, and along with that, a fixing force of the regulating member to the housing needs to be enhanced. However, if the fixing force of the regulating member to the housing is to be increased, management of pressure-fitting becomes difficult, which might lower workability.

An object of the present disclosure is to provide a bearing structure which can firmly fix the regulating member that regulates rotation of the semi-floating metal bearing to the housing without lowering workability, and a turbocharger.

A first aspect of the present disclosure is a bearing structure including: a bearing hole formed in a housing; a semi-floating metal bearing including a body portion accommodated in the bearing hole, the bearing configured to rotatably support a shaft inserted into the body portion, the body portion being provided with a pin hole penetrating in a direction intersecting with an axial direction of the shaft; a through-hole formed in the housing, facing the pin hole in the body portion of the semi-floating metal bearing; a regulating member inserted into the through-hole, a fixed portion of the regulating member located closer to a base end side in an insertion direction than a distal end portion of the regulating member being pressed onto an inner surface of the through-hole for the regulating member to be fixed to the bearing housing at a fixed position where the distal end portion located on a distal end side in the insertion direction is inserted into the pin hole; a regulating hole opened at a base end in the insertion direction of the regulating member and extending at least to the fixed portion toward the distal end side; and a pressing member provided in the regulating hole to expand the regulating hole by pressing an inner surface of the regulating hole.

In the insertion direction, a taper portion whose cross-sectional area perpendicular to the insertion direction changes may be formed on at least either one of an outer surface of the pressing member or the inner surface of the regulating hole.

The regulating hole may have a circular cross-sectional shape perpendicular to the insertion direction, and the pressing member may be a spherical body having a diameter larger than an inner diameter of the regulating hole.

A second aspect of the present disclosure is a bearing structure including: a bearing hole formed in a housing; a semi-floating metal bearing including a body portion accommodated in the bearing hole, the bearing configured to rotatably support a shaft inserted into the body portion, the body portion being provide with a pin hole penetrating in a direction intersecting with an axial direction of the shaft; a through-hole formed in the housing, facing the pin hole in the body portion of the semi-floating metal bearing; and a regulating member inserted into the through-hole, a fixed portion of the regulating member located closer to a base end side in an insertion direction than a distal end portion of the regulating member being pressed onto an inner surface of the through-hole for the regulating member to be fixed to the bearing housing at a fixed position where the distal end portion located on a distal end side in the insertion direction is inserted into the pin hole; wherein, in a state where the regulating member has reached the fixed position, the fixed portion is expanded more in a lateral direction perpendicular to the insertion direction than during movement in the through-hole until the regulating member reaches the fixed position, and causes a pressing force to act on the inner surface of the through-hole.

A plurality of projections may be formed on an outer surface of the fixed portion of the regulating member.

A third aspect of the present disclosure is a turbocharger including a bearing structure according to the first or the second aspect.

According to the present disclosure, the regulating member that regulates rotation of the semi-floating metal bearing can be firmly fixed to the housing without lowering workability.

DESCRIPTION OF THE EMBODIMENTS

Figure 1:
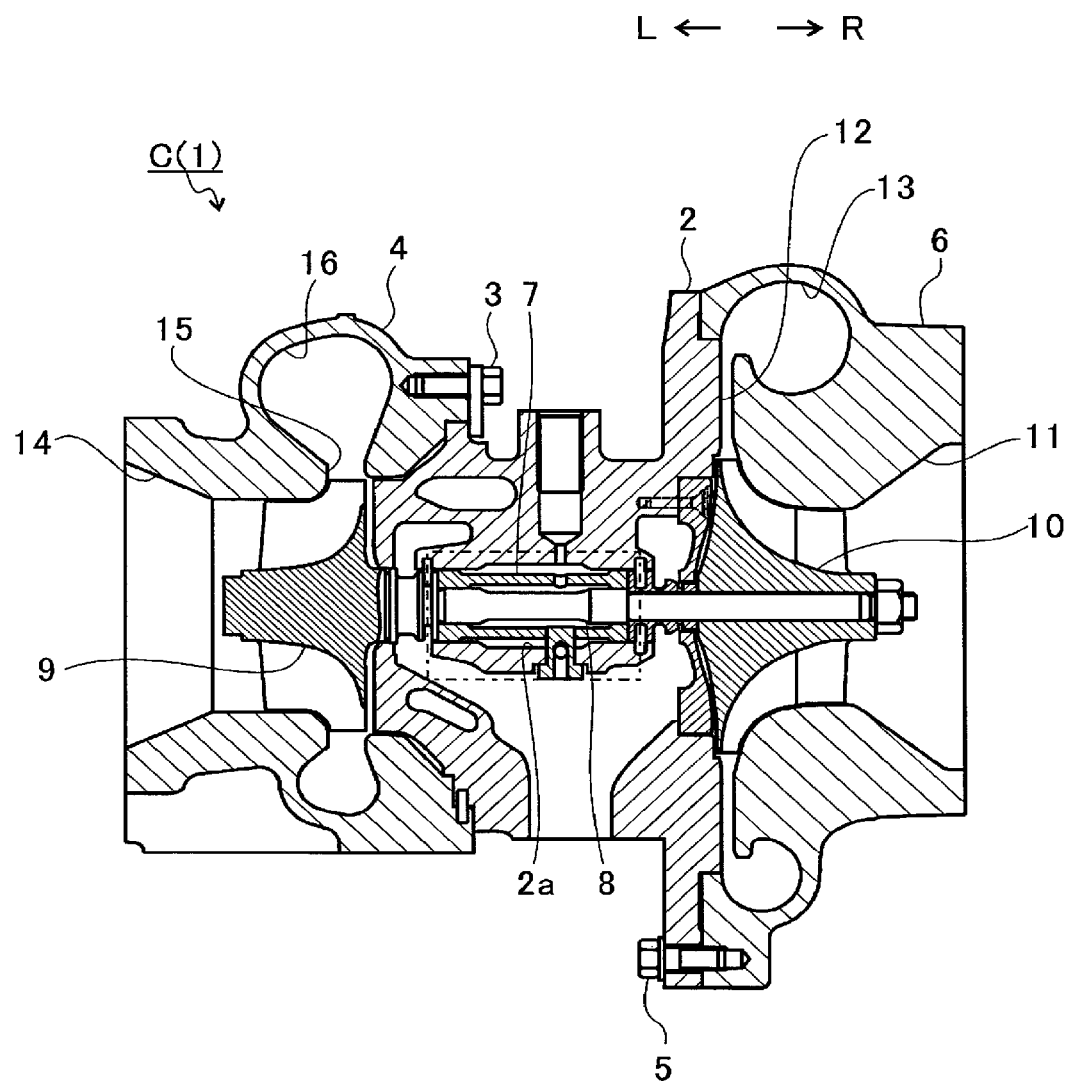
FIG. 1 is a schematic cross-sectional diagram of a turbocharger according to an embodiment of the present disclosure.

An embodiment of the present disclosure will be described below in detail by referring to the attached drawings. Dimensions, materials, and other specific numerical values and the like illustrated in the embodiment are only exemplification for facilitating understanding of the disclosure and do not limit the present disclosure unless otherwise specified. Note that, in this description and the drawings, element having substantially the same functions and configurations are given the same reference numerals, whereby duplicated explanation will be omitted, and elements not directly relating to the present disclosure are not illustrated.

FIG. 1 is a schematic cross-sectional diagram of a turbocharger C. In the following explanation, an arrow L indicated in FIG. 1 is assumed to be a direction indicating a left-hand side of the turbocharger C, and an arrow R is assumed to be a direction indicating a right-hand side of the turbocharger C. As illustrated in FIG. 1, the turbocharger C includes a turbocharger body 1. The turbocharger body 1 has a bearing housing 2 (housing), a turbine housing 4 connected to a left-hand side of the bearing housing 2 by a fastening bolt 3, and a compressor housing 6 connected to a right-hand side of the bearing housing 2 by a fastening bolt 5. These are integrated.

A bearing hole 2a is formed in the bearing housing 2. The bearing hole 2a penetrates the bearing housing 2 in a right-and-left direction of the turbocharger C. A semi-floating metal bearing 7 is accommodated in this bearing hole 2a. The semi-floating metal bearing 7 rotatably supports a shaft 8. A turbine wheel 9 is integrally fixed to a left end portion of the shaft 8. This turbine wheel 9 is rotatably accommodated in the turbine housing 4. Furthermore, a compressor wheel 10 is integrally fixed to a right end portion of the shaft 8. This compressor wheel 10 is rotatably accommodated in the compressor housing 6.

An intake port 11 is formed in the compressor housing 6. The intake port 11 is opened on the right-hand side of the turbocharger C and is connected to an air cleaner (not shown). Further, in a state where the bearing housing 2 and the compressor housing 6 are connected by the fastening bolt 5, facing surfaces of the both housings 2 and 6 form a diffuser flow path 12 which raises a pressure of air. This diffuser flow path 12 is annularly formed from an inner side toward an outer side in a radial direction of the shaft 8 and communicates with the intake port 11 via the compressor wheel 10 on the inner side in the radial direction.

In addition, the compressor housing 6 is provided with a compressor scroll flow path 13. The compressor scroll flow path 13 is located on the outer side of the diffuser flow path 12 in the radial direction of the shaft 8 and is annularly formed. The compressor scroll flow path 13 communicates with an intake port (not shown) of the engine and communicates also with the diffuser flow path 12. Therefore, when the compressor wheel 10 is rotated, the air is suctioned into the compressor housing 6 from the intake port 11, is accelerated and pressure-increased in a process of flowing through a space between blades of the compressor wheel 10, is pressurized by the diffuser flow path 12 and the compressor scroll flow path 13, and is led to the intake port of the engine.

A discharge port 14 is formed in the turbine housing 4. The discharge port 14 is opened on the left-hand side of the turbocharger C and is connected to an exhaust gas purifying device (not shown). Furthermore, the turbine housing 4 is provided with a flow path 15 and a turbine scroll flow path 16. The turbine scroll flow path 16 is located on the outer side of the flow path 15 in the radial direction of the shaft 8 (turbine wheel 9) and is annularly formed. The turbine scroll flow path 16 communicates with a gas inlet (not shown) into which the exhaust gas exhausted from an exhaust manifold of the engine is introduced. Moreover, the turbine scroll flow path communicates also with the aforementioned flow path 15. Therefore, the exhaust gas introduced from the gas inlet into the turbine scroll flow path 16 is introduced into the discharge port 14 via the flow path 15 and the turbine wheel 9, and in this flow process, the exhaust gas rotates the turbine wheel 9. In addition, a rotating force of the turbine wheel 9 is transmitted to the compressor wheel 10 via the shaft 8, and the air is pressure-increased by the rotating force of the compressor wheel 10 as described above and is introduced into the intake port of the engine.

Figure 2:
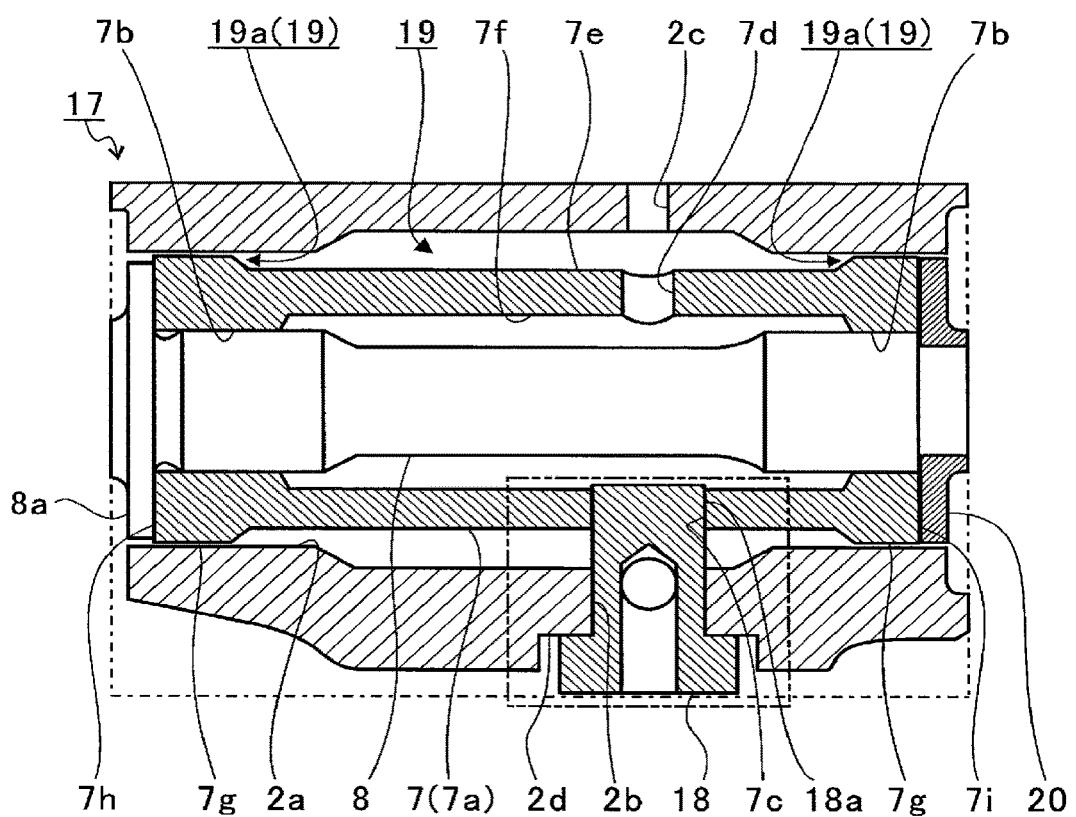
FIG. 2 is an extracted diagram of a one-dot chain line portion in FIG. 1.

FIG. 2 is an extracted diagram of a one-dot chain line portion in FIG. 1. As illustrated in FIG. 2, the turbocharger C includes a bearing structure 17. The bearing structure 17 includes a bearing hole 2a (in other words, an inner circumferential surface forming the bearing hole 2a) formed in the bearing housing 2 and the semi-floating metal bearing 7.

The semi-floating metal bearing 7 has a hollow and cylindrically-shaped body portion 7a accommodated in the bearing hole 2a. Two bearing surfaces 7b are formed separately in an axial direction of the shaft 8, on an inner circumference of the body portion 7a. The shaft 8 is inserted through the body portion 7a of the semi-floating metal bearing 7 and is rotatably supported by the bearing surfaces 7b.

A pin hole 7c is formed at a position between the two bearing surfaces 7b in the body portion 7a. The pin hole 7c penetrates the body portion 7a in a direction intersecting with an axial direction of the shaft 8 or, here, a radial direction of the shaft 8. In addition, in the bearing housing 2, a through-hole 2b is provided so as to face the pin hole 7c.

The regulating member 18 is inserted into the through-hole 2b. Furthermore, a distal end portion 18a located on a distal end side in its insertion direction (an inner side in a radial direction of the shaft 8) is inserted into the pin hole 7c. As illustrated in FIG. 2, the regulating member 18 is fixed to the bearing housing (through-hole 2b) at a fixed position set in advance. The regulating member 18 will be described later in detail.

As described above, movement of the semi-floating metal bearing 7 in a rotating direction of the shaft 8 is regulated by insertion of the distal end portion 18a of the regulating member 18 into the pin hole 7c.

An oil hole 7d penetrates from an outer circumferential surface 7e to an inner circumferential surface 7f of the body portion 7a, in the radial direction of the shaft 8. An opening on the outer circumferential surface 7e side of the oil hole 7d faces an opening on the bearing hole 2a side of an oil flow path 2c formed in the bearing housing 2. Lubricating oil having flowed through the oil flow path 2c is supplied to the bearing hole 2a. After that, a part of the lubricating oil is led to an inner circumference of the body portion 7a through the oil hole 7d, whereas the other part (remaining part) is supplied to a gap 19 formed between the outer circumferential surface 7e of the body portion 7a and the inner circumferential surface of the bearing hole 2a.

In the outer circumferential surface 7e of the body portion 7a, a portion where the gap 19 from the inner circumferential surface of the bearing hole 2a is the narrowest forms a damper surface 7g. The lubricating oil supplied to the gap 19a between the damper surface 7g and the inner circumferential surface of the bearing hole 2a functions as a damper, and vibration of the shaft 8 is suppressed.

Note that center axes of the through-hole 2b and the oil flow path 2c in the bearing housing 2 coincide with each other. Therefore, the through-hole 2b and the oil flow path 2c can be formed in one processing step during processing of the bearing housing 2. Accordingly, a processing cost can be reduced.

As illustrated in FIG. 2, the shaft 8 has a flange portion 8a, as its part, provided on one side in the axial direction of the shaft 8. The flange portion 8a has an outer diameter larger than a portion inserted into the body portion 7a of the semi-floating metal bearing 7 in the shaft 8. In addition, the flange portion 8a faces an end surface 7h on one side (here, left-hand side in FIG. 2) in the axial direction of the shaft 8, in the body portion 7a of the semi-floating metal bearing 7.

As illustrated in FIG. 2, an oil thrower member 20 is provided on the other side in the axial direction of the shaft 8. The oil thrower member 20 is fixed to the shaft 8 and faces an end surface 7i on the other side (here, right-hand side in FIG. 2) in the axial direction of the shaft 8, in the body portion 7a of the semi-floating metal bearing 7. The oil thrower member 20 scatters the lubricating oil toward the compressor wheel 10 side from the semi-floating metal bearing 7, to an outer side in the radial direction of the shaft 8. Accordingly, leaking-out of the lubricating oil to the compressor wheel 10 side is suppressed.

Then, the end surface 7h of the semi-floating metal bearing 7 faces the flange portion 8a of the shaft 8 in the axial direction, and the flange portion 8a causes a thrust load to act on the end surface 7h. Furthermore, the end surface 7i of the semi-floating metal bearing 7 faces the oil thrower member 20 in the axial direction, and the oil thrower member 20 causes the thrust load to act on the end surface 7i.

As described above, this embodiment employs a configuration which receives also the thrust load for the semi-floating metal bearing 7 receiving a radial load without separately providing a thrust bearing for receiving the thrust load.

Figure 3A:
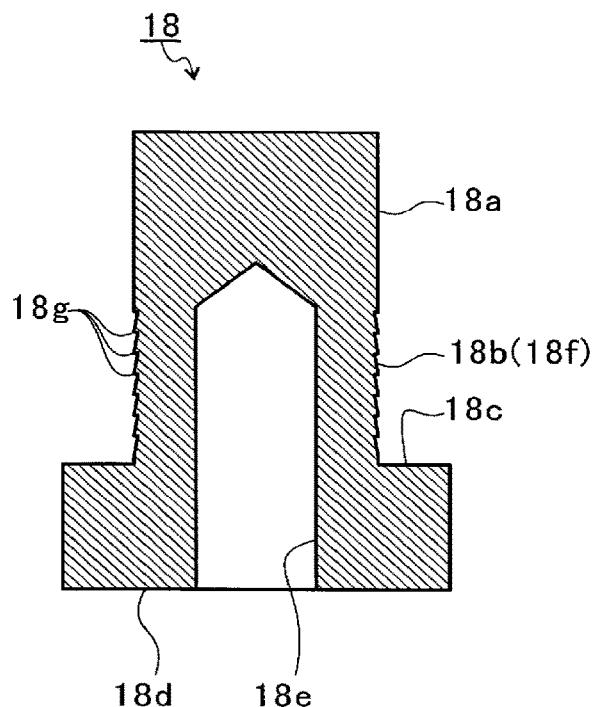
FIGS. 3A to 3D are diagrams for explaining a regulating member according to this embodiment.
Figure 3B:
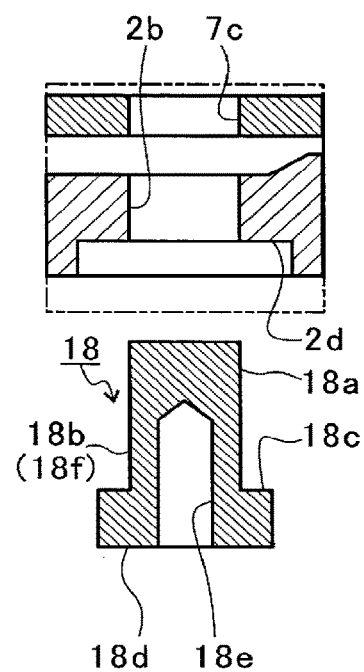
Figure 3C:
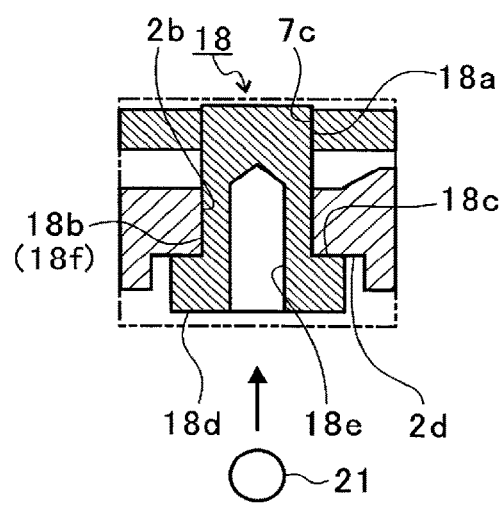
Figure 3D:
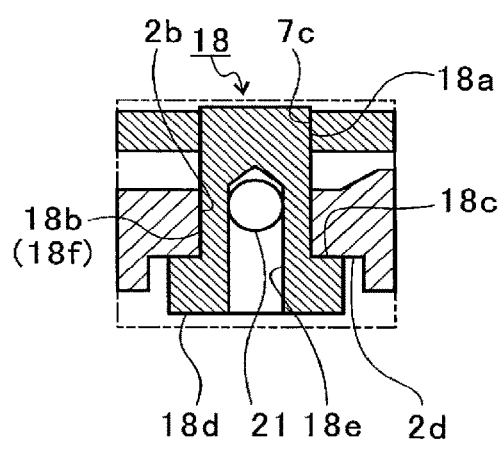

FIGS. 3A to 3D are diagrams for explaining the regulating member 18. FIG. 3A extracts and illustrates the regulating member 18 in FIG. 2. FIGS. 3B to 3D illustrate, step by step, states until the regulating member 18 is fixed in a two-dot chain line portion in FIG. 2.

The regulating member 18 is a member having a cylindrical shape. The regulating member 18 has the distal end portion 18a formed on a distal end side (an upper side in FIG. 3A) in the insertion direction into the through-hole 2b. As illustrated in FIG. 3D, the distal end portion 18a is a portion to be inserted into the pin hole 7c when the regulating member 18 is fixed to the bearing housing 2.

The regulating member 18 has a fixed portion 18b formed closer to a base end side in the insertion direction than the distal end portion 18a. As illustrated in FIG. 3D, the fixed portion 18b is a portion located in the through-hole 2b when the regulating member 18 is fixed to the bearing housing 2.

The regulating member 18 has a large-diameter portion 18c closer to the base end side in the insertion direction than the fixed portion 18b. The large-diameter portion 18c is formed successively to the fixed portion 18b. The large-diameter portion 18c has an outer diameter larger than that of the fixed portion 18b. In addition, in the large-diameter portion 18c, an end surface on a side opposite to the fixed portion 18b is a base end surface 18d located on the base end in the insertion direction of the regulating member 18.

Furthermore, a regulating hole 18e is formed in the regulating member 18. The regulating hole 18e is opened at the base end surface 18d and extends at least to the fixed portion 18b toward the distal end portion 18a side. The regulating hole 18e has, for example, a circular cross-sectional shape perpendicular to the insertion direction.

When the regulating member 18 is to be fixed to the bearing housing 2, first, as illustrated in FIGS. 3B and 3C, the regulating member 18 is inserted into the through-hole 2b and is further inserted into the pin hole 7c. Each of maximum outer diameters of the distal end portion 18a and the fixed portion 18b is smaller than each of inner diameters of the pin hole 7c and the through-hole 2b. Therefore, the regulating member 18 can be smoothly inserted into the through-hole 2b and the pin hole 7c.

The bearing housing 2 has a seat surface 2d having a diameter larger than that of the large-diameter portion 18c of the regulating member 18 on an inlet side of the through-hole 2b into which the regulating member 18 is inserted. The regulating member 18 is inserted into the through-hole 2b until the large-diameter portion 18c reaches a fixed position in contact with the seat surface 2d.

Then, as indicated by an arrow in FIG. 3C, a pressing member 21 is inserted into the regulating hole 18e. The pressing member 21 is a spherical body having a diameter larger than the inner diameter of the regulating hole 18e. As illustrated in FIG. 3D, when the pressing member 21 is inserted into the regulating hole 18e, the pressing member 21 presses the inner surface of the regulating hole 18e and expands the regulating hole 18e. In this way, the fixed portion 18b is pressed onto the inner surface of the through-hole 2b. In other words, the fixed portion 18b is brought into pressure-contact with the inner surface of the through-hole 2b. As a result, the regulating member 18 is fixed to the bearing housing 2.

As described above, in a state where the regulating member 18 has reached the fixed position illustrated in FIGS. 3C and 3D, the pressing member 21 is inserted into the regulating hole 18e. As a result, the fixed portion 18b is expanded more in the lateral direction perpendicular to the insertion direction after the regulating member 18 has reached the fixed position than during movement in the through-hole 2b until the regulating member 18 reaches the fixed position, and causes a pressing force (pressure-contact force) to act on the inner surface of the through-hole 2b.

Namely, insertion of the regulating member 18 into the through-hole 2b and the pin hole 7c can be smoothly carried out, and thus, even if the fixing force of the regulating member 18 to the bearing housing 2 is enhanced, lowering of the workability can be suppressed.

Furthermore, as illustrated in FIG. 3A, a plurality of projections 18g is formed on an outer surface 18f of the fixed portion 18b in the regulating member 18. Accordingly, as illustrated in FIG. 3D, when the regulating hole 18e is pushed and expanded by the pressing member 21, the projections 18g (see FIG. 3A) formed on the outer surface 18f of the fixed portion 18b bite into the inner surface of the through-hole 2b. As a result, removal of the regulating member 18 is suppressed.

Here, the projections 18g protrude toward a slightly lower direction than the right-and-left direction in FIG. 3A. Namely, the projections 18g protrude in an inclined manner toward the base end surface 18d side with respect to the radial direction of the fixed portion 18b. Accordingly, when the regulating member 18 moves to a direction removed from the through-hole 2b, the projections 18g further bite into the inner surface of the through-hole 2b, whereby removal of the regulating member 18 is further suppressed.

Furthermore, since the large-diameter portion 18c of the regulating member 18 is brought into contact with the seat surface 2d, movement in the insertion direction of the regulating member into the through-hole 2b is regulated, and thus positional displacement of the regulating member 18 to the insertion direction is avoided.

In this embodiment, the large-diameter portion 18c of the regulating member 18 is brought into contact with the seat surface 2d of the bearing housing 2. However, a small-diameter portion having an outer diameter smaller than the fixed portion 18b may be provided at the distal end portion of the regulating member 18, and a large-diameter portion having an inner diameter larger than the fixed portion 18b and a small-diameter portion having an inner diameter smaller than the fixed portion 18b closer to the distal end side in the insertion direction than the large-diameter portion may be provided as the through-hole 2b. Then, the movement of the regulating member 18 in the insertion direction into the through-hole 2b may be regulated by coming contact of a stepped surface caused by an outer diameter difference between the fixed portion 18b and the small-diameter portion of the regulating member 18, with a stepped surface caused by an inner diameter difference between the large-diameter portion and the small-diameter portion in the through-hole 2b.

Figure 4A:
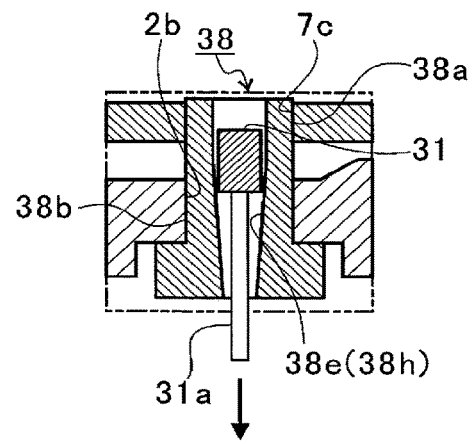
FIGS. 4A and 4B are diagrams for explaining a first modification of this embodiment.
Figure 4B:
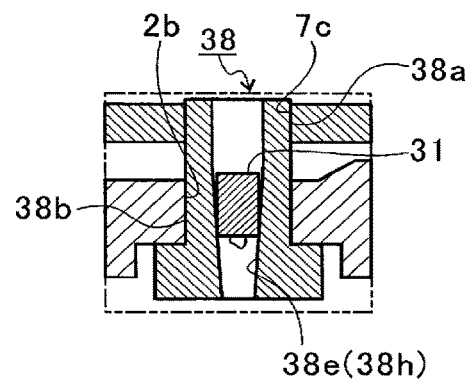

FIGS. 4A and 4B are diagrams for explaining a first modification of this embodiment and illustrate a portion corresponding to the two-dot chain line portion in FIG. 2. As illustrated in FIG. 4A, in the first modification, a regulating hole 38e is formed in a regulating member 38. The regulating hole 38e penetrates the regulating member 38 in the insertion direction into the through-hole 2b.

Furthermore, a taper portion 38h is formed on an inner surface of the regulating hole 38e located inside a fixed portion 38b. The taper portion 38h has a shape such that a cross-sectional area of the regulating hole 38e perpendicular to the insertion direction gradually increases (changes) toward the insertion direction (upper side in FIG. 4A) to the through-hole 2b.

The pressing member 31 is a member having a columnar shape, and a protruding portion 31a protruding to a center axis direction of the pressing member 31 is provided at one end of the pressing member 31. Then, the pressing member 31 is inserted into the regulating hole 38e from a distal end portion 38a side of the regulating member 38. At this time, in the pressing member 31, the protruding portion 31a is first inserted into the regulating hole 38e. The protruding portion 31a protrudes from the regulating hole 38e (regulating member 38) as illustrated in FIG. 4A.

When the regulating member 38 is fixed to the bearing housing 2, first, in a state where the pressing member 31 is inserted into the regulating hole 38e, the regulating member 38 is inserted into the through-hole 2b and furthermore, is inserted into the pin hole 7c. Then, the entire pressing member 31 is pushed into the taper portion 38h of the regulating hole 38e as illustrated in FIG. 4B by pulling the protruding portion 31a protruding from the regulating hole 38e as indicated by an arrow in FIG. 4A. The protruding portion 31a is fractured when a tensile load exceeds the threshold value.

As described above, the fixed portion 38b is pushed and expanded, and pressed onto the inner surface of the through-hole 2b, by actions of the pressing member 31 and the taper portion 38h, and the regulating member 38 is fixed to the bearing housing 2.

Figure 5A:
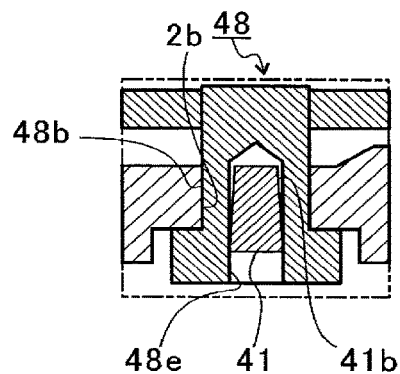
FIGS. 5A to 5C are diagrams for explaining second to fourth modifications of this embodiment, respectively.
Figure 5B:
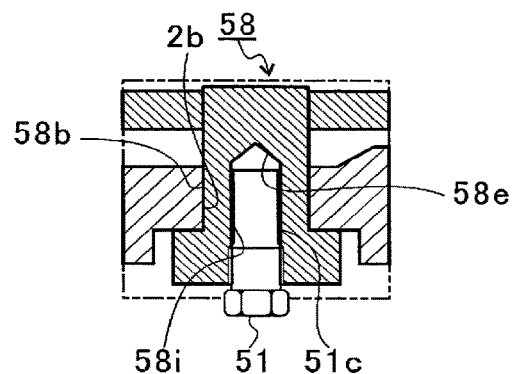
Figure 5C:
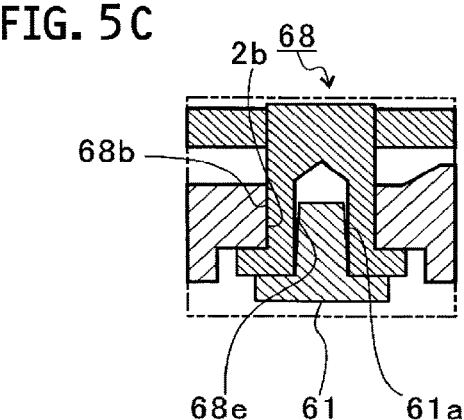

FIGS. 5A to 5C are diagrams for explaining second to fourth modifications of this embodiment, respectively. In the second modification illustrated in FIG. 5A, a pressing member 41 is a member having a columnar shape, and a taper portion 41b is formed on an outer circumferential surface. The taper portion 41b has a shape such that a cross-sectional area (an outer diameter, here) of the pressing member 41 perpendicular to the insertion direction gradually decreases (changes) toward the insertion direction (upper side in FIG. 5A) into the through-hole 2b. Moreover, in the taper portion 41b, a position having the largest outer diameter is one larger than the inner diameter of the regulating hole 48e.

Accordingly, as illustrated in FIG. 5A, when the pressing member 41 is inserted into the regulating hole 48e, the pressing member 41 presses an inner surface of the regulating hole 48e and expands the regulating hole 48e. In this way, the fixed portion 48b is pressed onto the inner surface of the through-hole 2b, and the regulating member 48 is fixed to the bearing housing 2.

In the third modification illustrated in FIG. 5B, a screw groove 58i is formed in an inner surface of a regulating hole 58e. Furthermore, a pressing member 51 is constituted by a bolt, and a screw portion 51c screwed to the screw groove 58i in the inner surface of the regulating hole 58e is formed on an outer surface of the pressing member 51.

However, an effective diameter of the screw portion 51c of the pressing member 51 is slightly larger than an effective diameter of the screw groove 58i of the regulating hole 58e, and when the pressing member 51 is inserted into the regulating hole 58e while the screw portion 51c is screwed to the screw groove 58i, the pressing member 51 presses the inner surface of the regulating hole 58e and expands the regulating hole 58e. In this way, the fixed portion 58b is pressed onto the inner surface of the through-hole 2b, and the regulating member 58 is fixed to the bearing housing 2.

In the fourth modification illustrated in FIG. 5C, a pressing member 61 is constituted by, for example, a rivet. An inner diameter of a regulating hole 68e is smaller than an outer diameter of a small-diameter portion 61a driven into the regulating member 68 in the pressing member 61. Accordingly, when the small-diameter portion 61a is driven into the regulating hole 68e, a fixed portion 68b is pressed onto the inner surface of the through-hole 2b, and the regulating member 68 is fixed to the bearing housing 2.

Figure 6A:
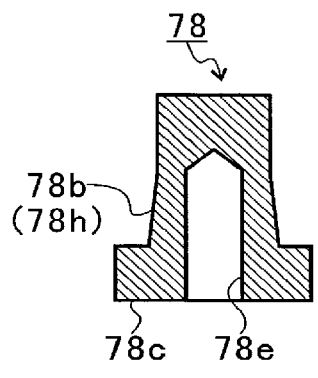
FIGS. 6A to 6D are diagrams for explaining a fifth modification of this embodiment.

FIGS. 6A to 6D are diagrams for explaining the fifth modification. As illustrated in FIG. 6A, a regulating member 78 of the fifth modification has an outer surface of a fixed portion 78b formed as a taper portion 78h. The taper portion 78h has a shape such that a cross-sectional area (an outer diameter, here) of the regulating member 78 perpendicular to the insertion direction gradually decreases toward the insertion direction (upper side in FIG. 6A) to the through-hole 2b. In addition, a regulating hole 78e is formed on an inner side of a portion where the taper portion 78h is formed.

The regulating hole 78e extends from a large-diameter portion 78c toward a distal end side of the regulating member 78. An inner diameter of the regulating hole 78e is set to a value at which the taper portion 78h can be elastically deformed to an inner side in a radial direction of the regulating member 78 by being sandwiched by a jig J which will be described later from an outer side of the large-diameter portion 78c.

Figure 6B:
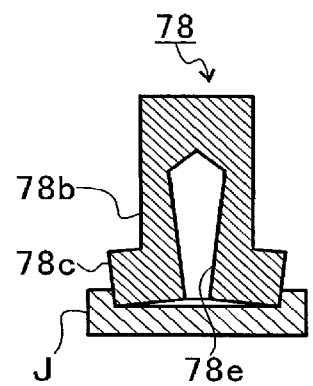

In addition, as illustrated in FIG. 6B, an outer diameter of the large-diameter portion 78c is reduced (contracted) within a range of elastic deformation by using the jig J. As a result, the taper portion 78h has a substantially uniform outer diameter over the insertion direction to the through-hole 2b and the outer diameter becomes smaller than that of the through-hole 2b. At this time, the large-diameter portion 78c side of the regulating hole 78e has a tapered shape.

Figure 6C:
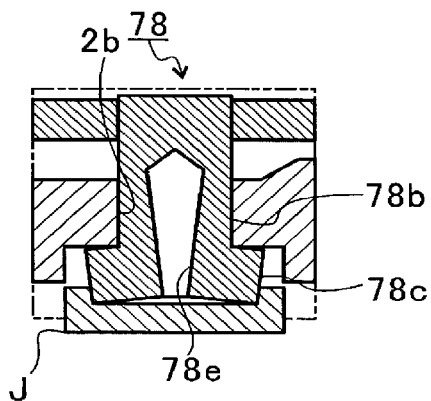
Figure 6D:
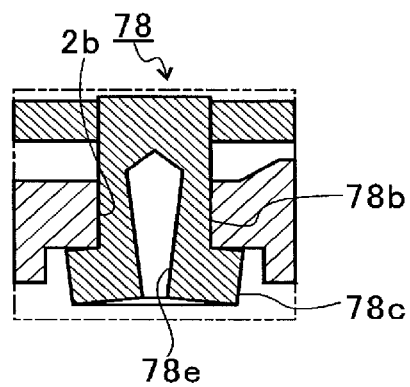

In this state, as illustrated in FIG. 6C, the regulating member 78 is inserted into the through-hole 2b and the pin hole 7c. After that, as illustrated in FIG. 6D, the fixed portion 78b is pushed and expanded by the amount of elastic deformation through removal of the jig J from the large-diameter portion 78c. In this way, the fixed portion 78b is pressed onto the inner surface of the through-hole 2b, and the regulating member 78 is fixed to the bearing housing 2.

In the aforementioned embodiment and modifications, the case where the regulating members 18, 38, 48, 58, 68, and 78 have substantially columnar shapes (cylindrical shapes) is described, but each of the regulating members 18, 38, 48, 58, 68, and 78 may have any shape. For example, the regulating member may have a polygonal cross-sectional shape perpendicular to the insertion direction to the through-hole 2b and can be arbitrary as long as the member has a shape of pressing and expanding the inner surface of the corresponding regulating hole. Similarly, the cross-sectional shape of the regulating hole perpendicular to the insertion direction to the through-hole 2b is not limited to a circle or the like, but can be an arbitrary shape within a range in which the effects of the aforementioned embodiment and modifications can be exerted.

Furthermore, in the aforementioned embodiment and modifications, the regulating members 18, 38, 48, 58, 68, and 78 are provided with the regulating holes 18e, 38e, 48e, 58e, 68e, and 78e. However, the regulating holes 18e, 38e, 48e, 58e, 68e, and 78e may be omitted.

Moreover, in the aforementioned embodiment and modifications, the pressing members 21, 31, 41, 51, and 61 are inserted into the regulating holes 18e, 38e, 48e, 58e, and 68e. However, the pressing members 21, 31, 41, 51, and 61 may be omitted. For example, as in the fifth modification, the regulating member 78 may be fixed to the bearing housing 2 by an elastic force of the regulating member 78. However, a fixing force to the bearing housing 2 can be easily enhanced by provision of the pressing members 21, 31, 41, 51, and 61.

In addition, in the aforementioned first modification, the taper portion 38h is formed on the inner surface of the regulating hole 38e, and in the second modification, the taper portion 41b is formed on the outer surface of the pressing member 41. However, the taper portions 38h and 41b may be omitted. However, removal of the pressing members 31 and 41 is suppressed by provision of the taper portions 38h and 41b.

Additionally, in the aforementioned embodiment, the regulating hole 18e has a circular cross-sectional shape perpendicular to the insertion direction of the regulating member 18, and the pressing member 21 is a spherical body having a diameter larger than the inner diameter of the regulating hole 18e. However, the cross-sectional shape perpendicular to the insertion direction of the regulating member 18 is not limited to a circle, and the pressing member 21 is not limited to the spherical body having the diameter larger than the inner diameter of the regulating hole 18e. However, it becomes possible to uniformly press and expand the inner surface of the regulating hole 18e in the circumferential direction when inserting the pressing member 21 into the regulating hole 18e by setting the cross-sectional shape of the regulating hole 18e perpendicular to the insertion direction of the regulating member 18 to a circle and by setting the pressing member 21 to the spherical body having the diameter larger than the inner diameter of the regulating hole 18e.

Furthermore, in the aforementioned embodiment and modifications, the plurality of projections 18g is formed on the outer surfaces of the fixed portions 18b, 38b, 48b, 58b, 68b, and 78b. However, the projections 18g may be omitted.

Moreover, in the aforementioned embodiment and modifications, a thrust bearing for receiving a thrust load is not separately provided, and the semi-floating metal bearing 7 receives the thrust load in addition to the radial load. However, a thrust bearing that receives the thrust load may be separately provided, and the semi-floating metal bearing 7 may receive mainly only the thrust load.

The embodiment of the present disclosure has been described above by referring to the attached drawings, but it is needless to say that the present disclosure is not limited to this embodiment. It is obvious that those skilled in the art could have conceived of various change examples or modification examples within the range described in the appended claims, and it is understood that they naturally belong to the technical range of the present disclosure.

What is claimed is:
1. A bearing structure, comprising:
a bearing hole formed in a housing;
a semi-floating metal bearing including a body portion accommodated in the bearing hole, the bearing rotatably supports a shaft inserted into the body portion, the body portion being provided with a pin hole penetrating in a direction intersecting with an axial direction of the shaft;
a through-hole formed in the housing, facing the pin hole in the body portion of the semi-floating metal bearing;
a regulating member inserted into the through-hole, including a distal end portion and a fixed portion located closer to a base end side in an insertion direction than the distal end portion, the fixed portion including an outer surface being pressed onto an inner surface of the through-hole for the regulating member to be fixed to the bearing housing at a fixed position where the distal end portion located on a distal end side in the insertion direction is inserted into the pin hole;
a regulating hole opened at a base end of the regulating member in the insertion direction of the regulating member and extending at least to the fixed portion toward the distal end side; and
a pressing member provided in the regulating hole to expand the regulating hole by pressing an inner surface of the regulating hole.
2. The bearing structure according to claim 1, wherein
in the insertion direction, a taper portion whose cross-sectional area perpendicular to the insertion direction changes is formed on at least either one of an outer surface of the pressing member or the inner surface of the regulating hole.

3. The bearing structure according to claim 2, wherein a plurality of projections is formed on the outer surface of the fixed portion of the regulating member.

4. The bearing structure according to claim 1, wherein the regulating hole has a circular cross-sectional shape perpendicular to the insertion direction, and the pressing member is a spherical body having a diameter larger than an inner diameter of the regulating hole.

5. The bearing structure according to claim 4, wherein a plurality of projections is formed on the outer surface of the fixed portion of the regulating member.

6. The bearing structure according to claim 1, wherein a plurality of projections is formed on the outer surface of the fixed portion of the regulating member.

7. A turbocharger comprising a bearing structure according to claim 1.

8. The bearing structure according to claim 1, wherein the regulating member includes a large-diameter portion closer to the base end side in the insertion direction than the fixed portion, and the large-diameter portion has an outer diameter larger than that of the fixed portion.

9. A bearing structure, comprising:
a bearing hole formed in a housing;
a semi-floating metal bearing including a body portion accommodated in the bearing hole, the body portion including an inner circumferential surface provided with bearing surfaces and a non-bearing surface located between the bearing surfaces, the bearing surfaces rotatably support a shaft inserted into the body portion, the body portion being provide with a pin hole penetrating in a direction intersecting with an axial direction of the shaft;
a through-hole formed in the housing, facing the pin hole in the body portion of the semi-floating metal bearing; and
a regulating member inserted into the through-hole, including a distal end portion and a fixed portion of the regulating member located closer to a base end side in an insertion direction than the distal end portion, the fixed portion including an outer surface being pressed onto an inner surface of the through-hole for the regulating member to be fixed to the bearing housing at a fixed position where the distal end portion located on a distal end side in the insertion direction is inserted into the pin hole; wherein,
in a state where the regulating member has reached the fixed position, the fixed portion is expanded more in a lateral direction perpendicular to the insertion direction than during movement in the through-hole until the regulating member reaches the fixed position, and causes a pressing force to the inner surface of the through-hole.

10. The bearing structure according to claim 9, wherein a plurality of projections is formed on the outer surface of the fixed portion of the regulating member.

11. A turbocharger comprising a bearing structure according to claim 9.

12. The bearing structure according to claim 9, wherein the regulating member includes a large-diameter portion closer to the base end side in the insertion direction than the fixed portion, and the large-diameter portion has an outer diameter larger than that of the fixed portion.

13. The bearing structure according to claim 9, wherein the outer surface of the fixed portion includes a tapered portion that decreases a cross-sectional area of the regulating member perpendicular to the insertion direction toward the insertion direction to the through-hole.

14. The bearing structure according to claim 13, wherein the regulating member includes a regulating hole opened at a base end of the regulating member in the insertion direction of the regulating member and extending at least to the fixed portion toward the distal end side; and
the regulating hole has an inner diameter that is set to a value at which the tapered portion is elastically deformable inward in a radial direction of the regulating member.

15. A bearing structure, comprising:
a bearing hole formed in a housing;
a semi-floating metal bearing including a body portion accommodated in the bearing hole, the bearing rotatably supports a shaft inserted into the body portion, the body portion being provide with a pin hole penetrating in a direction intersecting with an axial direction of the shaft;
a through-hole formed in the housing, facing the pin hole in the body portion of the semi-floating metal bearing; and
a regulating member inserted into the through-hole, including a distal end portion and a fixed portion of the regulating member located closer to a base end side in an insertion direction than the distal end portion, the fixed portion including an outer surface being pressed onto an inner surface of the through-hole for the regulating member to be fixed to the bearing housing at a fixed position where the distal end portion located on a distal end side in the insertion direction is inserted into the pin hole; wherein,
in a state where the regulating member has reached the fixed position, the fixed portion is expanded more in a lateral direction perpendicular to the insertion direction than during movement in the through-hole until the regulating member reaches the fixed position, and causes a pressing force to the inner surface of the through-hole, and
wherein the regulating member includes a large-diameter portion closer to the base end side in the insertion direction than the fixed portion, and the large-diameter portion has an outer diameter larger than that of the fixed portion.

* * * * *